(12) United States Patent
Horie

(10) Patent No.: US 8,854,014 B2
(45) Date of Patent: Oct. 7, 2014

(54) BATTERY CHARGING APPARATUS, ELECTRONIC APPARATUS, AND CHARGING METHOD

(75) Inventor: Yutaka Horie, Mitaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 701 days.

(21) Appl. No.: 13/095,789

(22) Filed: Apr. 27, 2011

(65) Prior Publication Data

US 2011/0267000 A1 Nov. 3, 2011

(30) Foreign Application Priority Data

Apr. 28, 2010 (JP) ................................. 2010-104339

(51) Int. Cl.
*H02J 7/04* (2006.01)
*G06F 1/26* (2006.01)
*G06F 1/28* (2006.01)

(52) U.S. Cl.
CPC ................. *G06F 1/263* (2013.01); *H02J 7/045* (2013.01); *G06F 1/28* (2013.01)
USPC .......................................... 320/162; 320/160

(58) Field of Classification Search
USPC ........................................................ 320/162
See application file for complete search history.

(56) References Cited

U.S. PATENT DOCUMENTS

| 7,443,139 B2 | 10/2008 | Mitsui et al. | |
| 2005/0269991 A1 | 12/2005 | Mitsui et al. | |
| 2007/0185551 A1 * | 8/2007 | Meadows et al. | 607/61 |
| 2008/0122399 A1 | 5/2008 | Nishino et al. | |
| 2009/0261786 A1 * | 10/2009 | Hsu et al. | 320/162 |
| 2010/0085015 A1 | 4/2010 | Hamaguchi et al. | |

FOREIGN PATENT DOCUMENTS

| JP | 09-084277 | 3/1997 |
| JP | 2004-093551 | 3/2004 |
| JP | 2005-251538 A | 9/2005 |
| JP | 2008-136330 | 6/2008 |
| JP | 2009-159698 A | 7/2009 |
| JP | 2009-176575 | 8/2009 |

OTHER PUBLICATIONS

Notice of Reasons for Rejection mailed by the Japan Patent Office on Sep. 6, 2011 in the corresponding Japanese Patent Application No. 2010-104339 in 7 pages.

\* cited by examiner

*Primary Examiner* — Drew A Dunn
*Assistant Examiner* — Robert Grant
(74) *Attorney, Agent, or Firm* — Knobbe, Martens, Olson & Bear LLP

(57) ABSTRACT

According to one embodiment, a charging method of a charging apparatus includes a protector for stopping charging of a battery when a first voltage value of the battery exceeds a threshold value, the method includes, measuring a second voltage value of the battery, before the battery is charged, calculating an impedance value of the battery, before the battery is charged, calculating, based on the second voltage value, the impedance value, and the threshold value, an overvoltage protection current value when charging of the battery is stopped by the protector, supplying charging power having the first charging current value based on a maximum allowable current value which is set for the battery when the charging is not stopped by the protector, and supplying charging power having a second charging current value based on the overvoltage protection current value when the charging is stopped by the protector.

13 Claims, 5 Drawing Sheets

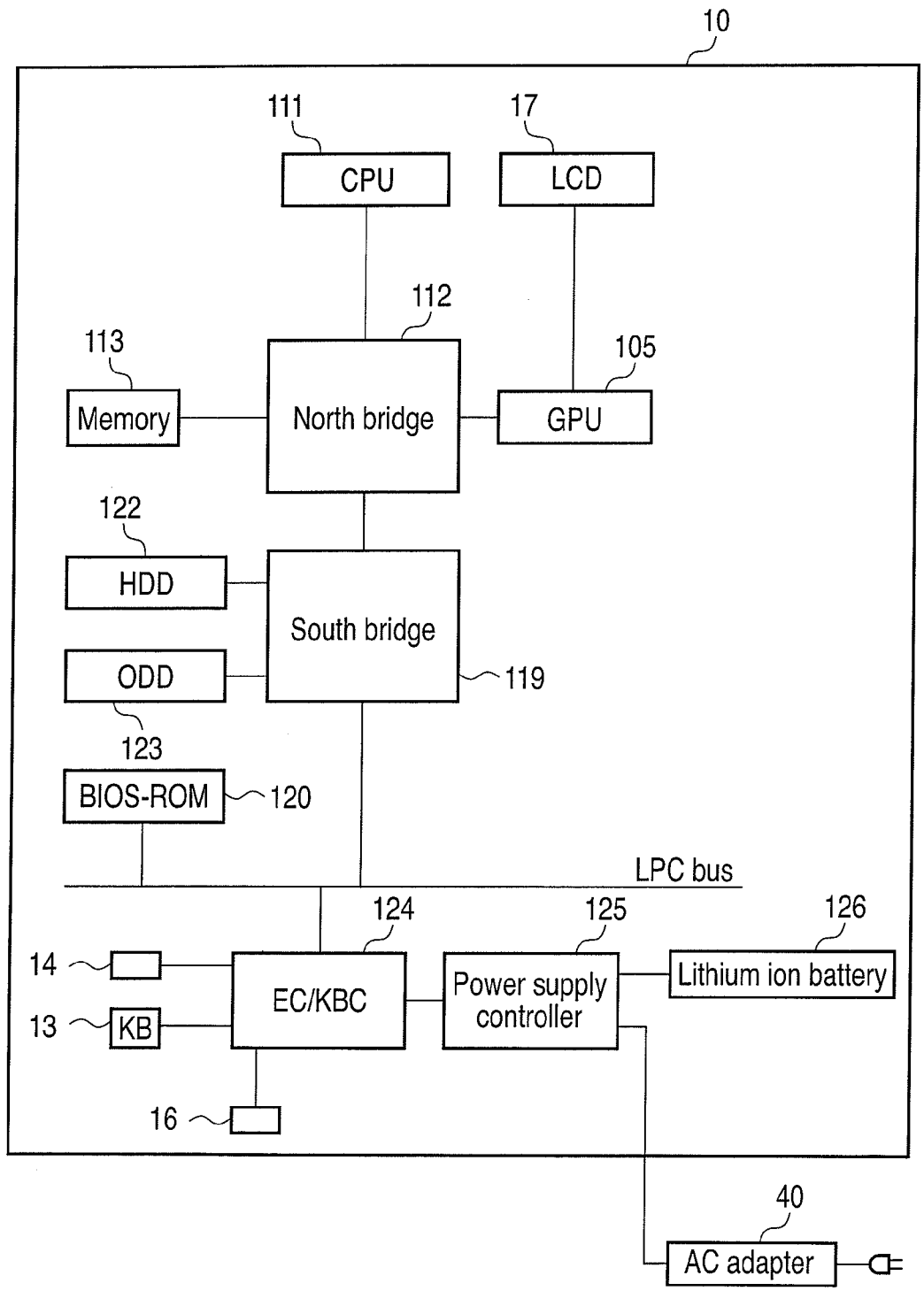
F I G. 2

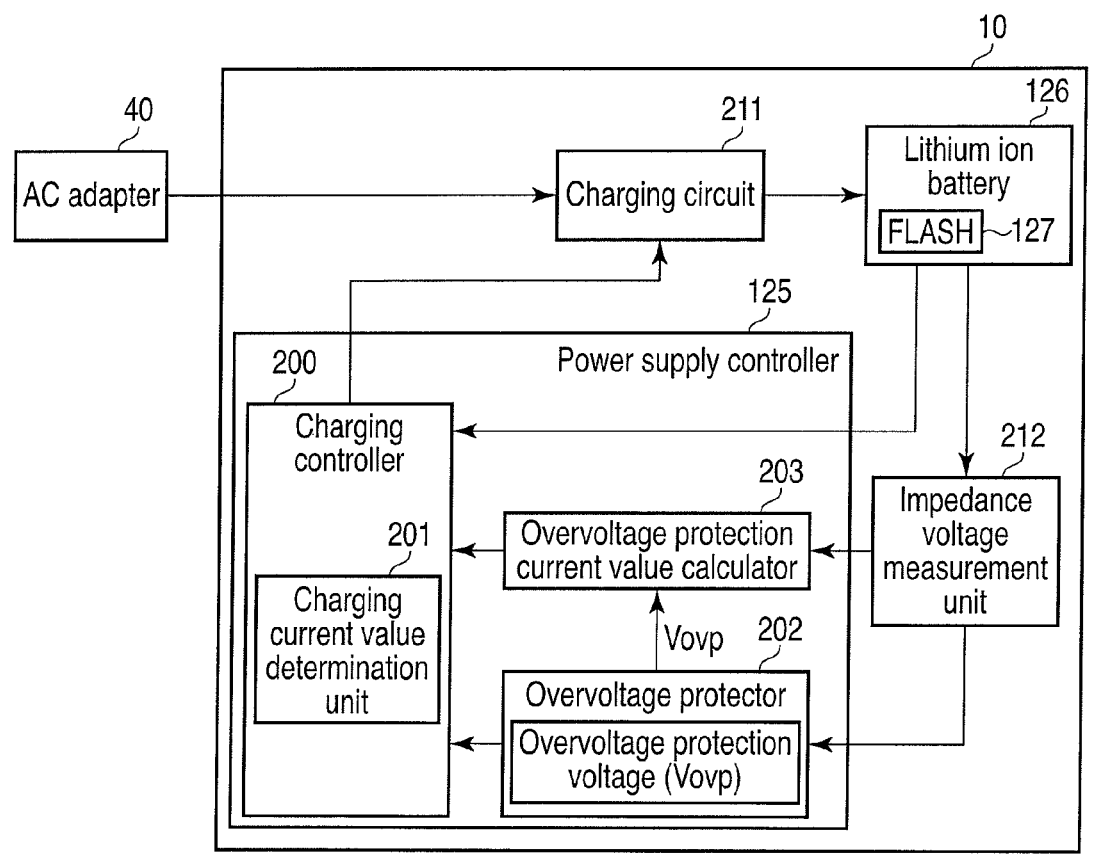
F I G. 3

BATTERY CHARGING APPARATUS, ELECTRONIC APPARATUS, AND CHARGING METHOD

CROSS-REFERENCE TO RELATED APPLICATIONS

This application is based upon and claims the benefit of priority from Japanese Patent Application No. 2010-104339, filed Apr. 28, 2010; the entire contents of which are incorporated herein by reference.

FIELD

Embodiments described herein relate generally to battery charging apparatus, electronic apparatus, and charging method.

BACKGROUND

A lithium ion battery is now widely used as a battery for a personal computer and cell phone.

When a battery is charged, the battery voltage is usually checked, and charging is stopped to prevent overcharging when the voltage increases to higher than a threshold level.

A lithium ion battery is increased in impedance after years of use. When a lithium battery with increased impedance is charged, the battery voltage is increased by the charging voltage and voltage generated by the impedance, an overcharge protection circuit functions, and charging may not be started. Other batteries whose impedance increases as the number of times of charging increases may not be charged.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block diagram of the electronic device and AC adapter shown in FIG. 1.

FIG. 3 is an exemplary diagram showing a system configuration for charging a lithium ion battery.

DETAILED DESCRIPTION

Various embodiments will be described hereinafter with reference to the accompanying drawings.

In general, according to one embodiment, a battery charging apparatus includes a charging module, a voltage measurement module, an impedance value measurement module, a protector, a current value calculator, a charging current value setting module, and a charge start command sending module. The charging module configured to supply, to a battery, charging power in order to charge the battery based on a current value which is set, a maximum allowable current value being set for the battery. The voltage measurement module configured to measure a first voltage value of the battery before the battery is charged. Then impedance value measurement module configured to measure an impedance value of the battery before the battery is charged. The protector configured to send, to the charging module, a charge stop command in order to stop a charging of battery when the first voltage value of the battery exceeds a threshold value. The current value calculator configured to calculate, based on the first voltage value, the impedance value, and the threshold value, an overvoltage protection current value of the battery at the time when the charge stop command is sent. The charging current value setting module configured to set, to the charging module, a first charging current value based on the maximum allowable current value when the charging is not stopped by the protector at the start of the charging, and to set, to the charging module, a second charging current value based on the overvoltage protection current value when the charging is stopped by the protector at the start of the charging. The charge start command sending module configured to send, to the charging module, a command to start the charging, after the charging current value setting module sets the first charging current value or the second charging current value to the charging module.

First, a configuration of an electronic device (a battery charger) according to an embodiment will be explained with reference to FIGS. 1 and 2. The electronic device (battery charger) is a realized as a portable battery-driven notebook computer.

Figure 1:
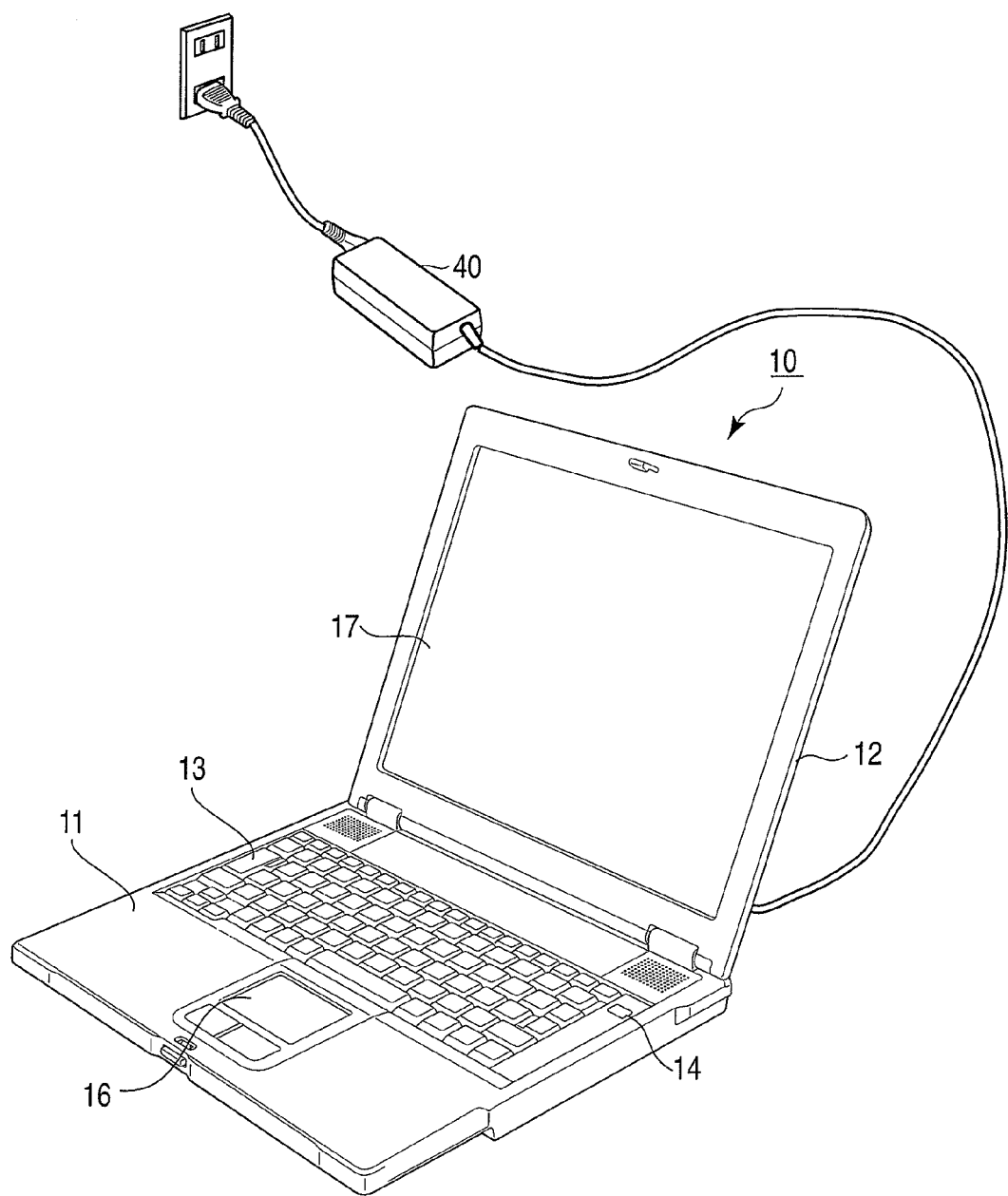
FIG. 1 is an exemplary perspective view of an electronic device (a battery charging) and AC adapter according to an embodiment.

FIG. 1 is a perspective view of a notebook computer with a display unit opened.

A computer 10 comprises a computer main unit 11, and a display unit 12. The display unit 12 includes a display comprising Liquid Crystal Display (LCD) 17. The display screen of the LCD 17 occupies a central area of the display unit 12.

The display unit 12 is pivotally fixed to the computer main unit 11 to be rotatable from the closed position to the opened position. The computer main unit 11 is housed in a thin box-shaped case. On the top face of the computer main unit 11, a keyboard 13, a power button 14 to turn the computer 10 on/off, and a touchpad 16 are provided. On the backside of the computer main unit 11, a power supply port 21 to connect a plug of an AC adapter 40 is provided.

Next, a system configuration of the computer 10 will be explained by referring to the block diagram of FIG. 2.

As shown in FIG. 2, the computer comprises a CPU 111, a north bridge 112, a main memory 113, a graphics processing unit (GPU) 105, a south bridge 119, a BIOS-ROM 120, a hard disk drive (HDD) 122, and an embedded controller/keyboard controller IC (EC/KBC) 124.

The CPU 101 is a processor to control the operations of the computer 10, and executes an operating system (OS) and various application programs loaded into the main memory 113 from the hard disk drive (HDD) 122.

The CPU 111 executes a Basic Input/Output System (BIOS) program stored in the BIOS-ROM 120. The BIOS-ROM 120 is a program to control hardware.

The north bridge 112 is a bridge device to connect the local bus of the CPU 111 and south bridge 119. The north bridge 112 contains a memory controller to control an access to the main memory 113. The north bridge 112 has a function of communicating with the GPU 105 through a CI Express bus.

The GPU 105 is a display controller to control an LCD 17 used as a display monitor of the computer 10. The GPU 105 has a video memory (VRAM), and generates a display image to be displayed on the LCD 17 of the display unit 12, from display data written in the video memory by the OS/application program.

The south bridge 119 controls devices on a Low Pin Count (LPC) bus. The south bridge 119 contains an Integrated Drive Electronics (IDE) controller to control the hard disk drive (HDD) 122 and optical disc drive (ODD) 123, a Peripheral Component Interconnect (PCI) controller, and a USB controller.

The optical disc drive 123 is a drive unit, which drives storage media such as a DVD and CD, and writes/deletes data into/from additional optical media such as a CD-R and DVD-R, and rewritable optical media such as a CD-RW, DVD-RW and DVD-RAM.

The embedded controller/keyboard controller IC (EC/KBC) 124 is a one-chip microcomputer provided with an embedded controller to control power, and a keyboard controller to control the keyboard (KB) 13 and touchpad 16. The embedded controller/keyboard controller IC (EC/KBC) 124 has a function of turning on/off the computer 10 according to the user's operation of the power button 14, by cooperating with the power supply controller.

The power supply controller 125 generates system power to be supplied to each component of the computer 10 by using external power supplied from the AC adapter 40 if it is used.

Next, control of charging a lithium ion battery 126 by the power supply controller 125 will be explained.

FIG. 3 is a diagram showing a configuration of a charging circuit according to the embodiment.

The power supply controller 125 comprises a charging controller 200, an overvoltage protector 202, and, an overvoltage protection current value calculator. The overvoltage controller 200 includes a charging current value determination unit 201. The computer 10 is provided with a charging circuit 211, and an impedance/voltage measurement unit 212.

A flash memory (FLASH) 127 of the lithium ion battery 126 stores a maximum allowable current value Imax of the lithium ion battery 126.

The charging circuit 211 starts and stops supply of charging power to the lithium ion battery 126 according to a charge start command and a charge stop command from the charging controller 200. At the start of charging, the charging circuit 211 supplies the lithium ion battery 126 with charging power with a certain current based on a preset current value Iset based on the current supplied from the charging controller 200 before start of charging. The charging circuit 211 supplies the charging power to the battery by constant current control using the preset current value Iset. When the voltage of the lithium ion battery 126 is increased to high than the preset voltage after the charging is started, the charging circuit 211 switches the charging current supplied to the battery 126, from the constant current control to constant voltage control. The charging circuit 211 supplies the charging power to the battery 126 by using the direct-current power supplied to the AC adapter 40.

Before the lithium ion battery 126 is charged by the charging circuit 211, the impedance/voltage measurement unit 212 measures the impedance value Z1 and voltage value V1 of the battery 126. When the voltage of the lithium ion battery 126 measured by the impedance/voltage measurement unit 212 during charging is higher than an overvoltage protection voltage Vovp, the overvoltage protector 202 sends the charging controller 200 a charge stop command to instruct to send the charge stop command from the charging controller 200 to the charging circuit 211. The overvoltage protection voltage Vovp is stored in a flash memory provided in the overvoltage protector 202, for example.

The overvoltage protection current value calculator 203 calculates an overvoltage protection current value Iovp, which activates the overvoltage protection function by the overvoltage protector 202, from the impedance value Z1 measured by the impedance voltage measurement unit 212 and overvoltage protection voltage value Vovp. The overvoltage protection current value calculator 203 informs the charging controller 200 of the calculated overvoltage protection current value Iovp. The overvoltage protection current Iovp will be explained.

The voltage V of the lithium ion battery 126 is the sum of the voltage of charging power and the voltage of the battery 126. The voltage of charging power is I×Z. I indicates a current value of the current flowing in the lithium ion battery 126.

Therefore, when the overvoltage protection functions at the start of charging, the following equation is established.

$$Vovp = Iovp \times Z1 + V1$$

The overvoltage protection current Iovp can be obtained by (Vovp−V1)/Z1.

The charging controller 200 obtains the maximum allowable current Imax stored in the flash memory 127 of the lithium battery 126. The charging controller 200 compares the maximum allowable current Imax with the overvoltage protection current Iovp, sends the maximum allowable current Imax, or the overvoltage protection current Iovp, based on the result of comparison, and specifies a constant-current charging current value during charging for the charging circuit 211.

When the maximum allowable current Imax is not higher than the overvoltage protection current Iovp, the charging controller 200 sends the charging circuit 211 a first charging current I1 based on the maximum allowable current Imax, thereby specifying the first charging current I1 as a preset charging current Iset for the charging circuit 211. When the maximum allowable current Imax is higher than the overvoltage protection current Iovp, the charging controller 200 sends the charging circuit 211 a second charging current I2 based on the overvoltage protection current Iovp, thereby specifying the second charging current I2 as a preset charging current Iset for the charging circuit 211.

The first charging current I1 is a value of 95% of the maximum allowable current Imax, for example. The second charging current I2 is a value of 95% of the overvoltage protection current Iovp, for example. The preset current value is set lower considering a margin. Since the maximum allowable current Imax is a value including a margin, it can be used as the first charging current I1. If the overvoltage protection current Vovp includes a margin, it can be used as the second charging current I2.

After specifying the preset charging current Iset, the charging controller 200 instructs the charging circuit 211 to start charging.

When charging/discharging is repeated few times, the maximum allowable current Imax is higher than the overvoltage protection current Iovp. When charging/discharging is repeated many times, the impedance of the lithium ion battery 126 increases, and the overvoltage protection current Iovp decreases. As a result, the maximum allowable current Imax becomes less than the overvoltage protection current Iovp, and the overvoltage protection is activated immediately after the start of charging.

When the maximum allowable current Imax is less than the overvoltage protection current Iovp, the overvoltage protection can be prevented by sending the second charging current I2 based on the overvoltage protection current Iovp, as the preset charging current Iset.

The charging controller 200 stores the impedance value Z1 and voltage value V1 measured by the impedance/voltage measurement unit 212 in the flash memory 127 of the lithium ion battery 126. By storing the impedance Z1 in the flash memory, the overvoltage protection current Iovp can be calculated by using the impedance Z1, even if the lithium ion battery 126 is charged by another battery charger.

Figure 4:
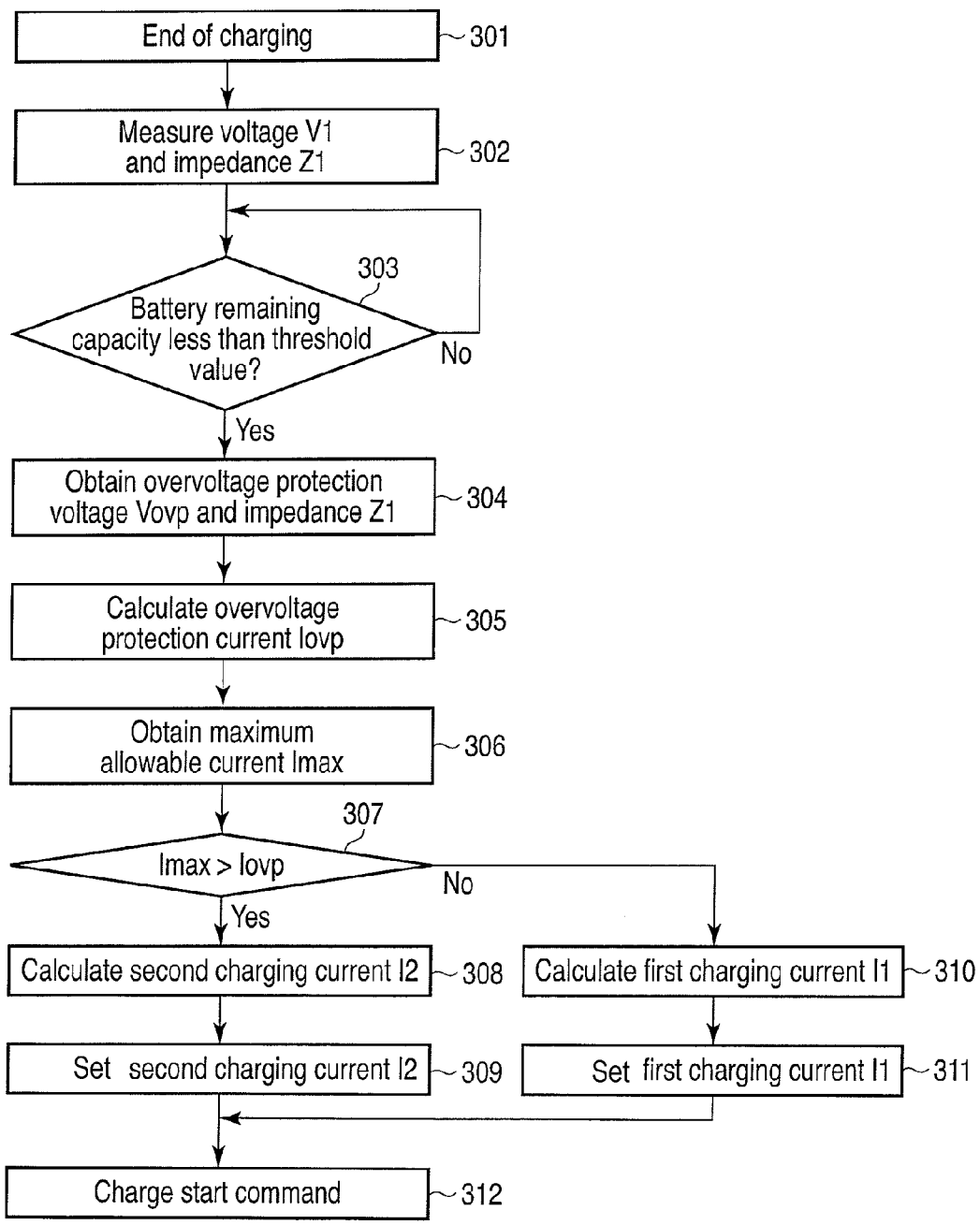
FIG. 4 is an exemplary flowchart of operations after the end of charging and at the start of charging.

Now, a procedure of charging the lithium battery 126 is explained by referring to the flowchart of FIG. 4.

When charging of the lithium ion battery 126 is completed (block 301), the impedance/voltage measurement unit 212 measures the voltage V1 and impedance Z1 of the battery 126 (block 302). The charging controller 200 monitors the discharged capacity of the battery 126, and determines whether the remaining capacity of the battery 126 is less than a threshold value (for example, 90% of the total capacity) previously stored in the charging controller 200 (block 303).

When the remaining capacity of the battery 126 is less than the threshold value (Yes, in block 303), the overvoltage protection current value calculator 203 obtains the impedance Z1 from the impedance/voltage measurement unit 212 (block 304). On the other hand, when the remaining capacity of the battery 126 is not less than the threshold value (No, in block 303), block 303 is resumed. The charging current value calculator 301 calculates the overvoltage protection current Iovp from the voltage V1, impedance Z1 and overvoltage protection voltage Vovp (block 305). The charging current value calculator 301 informs the charging controller 200 of the calculated overvoltage protection current Iovp.

The charging controller 200 obtains the maximum allowable current Imax stored in the flash memory 127 of the lithium ion battery 126 (block 306). The charging current determination unit 201 determines whether the maximum allowable current Imax is larger than the overvoltage protection current Iovp (block 307).

When the maximum allowable current Imax is higher than the overvoltage protection current Iovp (Yes in block 307), the charging controller 200 calculates the second charging current I2 based on the overvoltage protection current Iovp (block 308). When the overvoltage protection current Iovp is specified as the preset charging current Iset for the charging circuit 211, the first charging current I1 is not calculated. The charging controller 200 sends the second charging current I2 to the charging circuit 211, and specifies the preset charging current Iset for the charging circuit 211 (block 309). After sending the second charging current I2, the charging controller 200 sends a command to start charging to the charging circuit 211 (block 312).

When the maximum allowable current Imax is not higher than the overvoltage protection current Iovp (No in block 307), the charging controller 200 calculates the first charging current I1 based on the maximum allowable current Imax (block 310). When the maximum allowable current Imax is specified as the preset charging current Iset for the charging circuit 211, the second charging current I2 is not calculated. The charging controller 200 sends the first charging current I1 to the charging circuit 211, and specifies the preset charging current Iset for the charging circuit 211 (block 311). After sending the first charging current, the charging controller 200 sends a command to start charging to the charging circuit 211 (block 312).

By the above operations, a charging current can be set in the charging circuit 211, and the lithium ion battery 126 can be charged. Since the charging current is set to a value for which the overvoltage protection is not activated at the start of charging, the lithium ion battery 126 can be charged without fail.

Since the overvoltage protection is activated when the number of times of charging/discharging increases and the battery impedance increases, when the number of times of battery charging/discharging is less than a preset number, the charging controller 200 may always send the charging circuit 211 a maximum allowable current Imax as the preset charging current Iset. When the number of times of battery charging/discharging is less than a preset number, and is a multiple of 5, for example, the maximum allowable current Imax is compared with the overvoltage protection current Iovp, and the maximum allowable current Imax or the overvoltage protection current Iovp may be sent according to the result of comparison.

A preset charging current may be set as follows. The charging controller 200 sends a first charging current I1 to the charging circuit 211 at the start of charging. When the overvoltage protector 202 sends a charge stop command to the charging controller 200, after the charging circuit 211 supplies charging power of the first charging current I1, the charging controller 200 sends the charge stop command to the charging circuit 211. The charging controller 200 sends a second charging current Is to the charging circuit 211, and sends a charge start command to the charging circuit 211.

Figure 5:
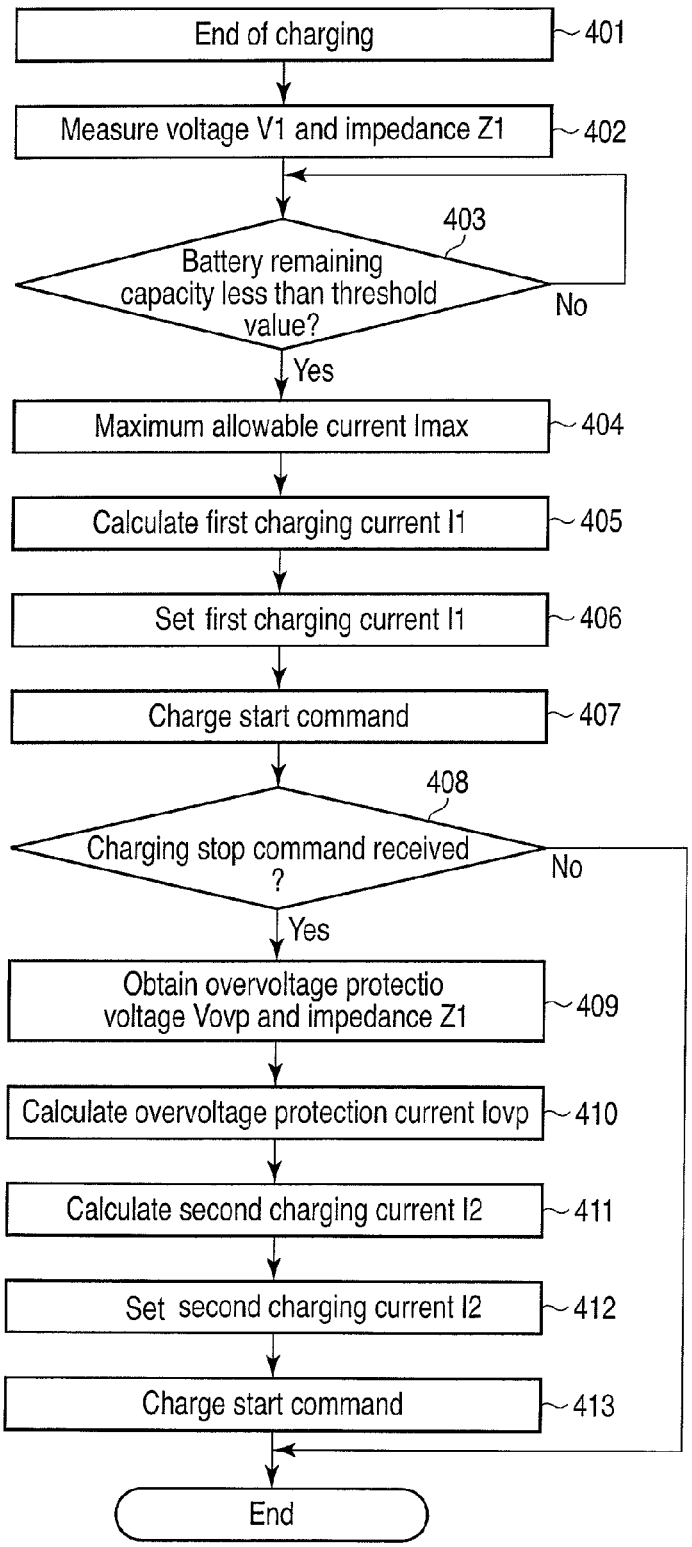
FIG. 5 is an exemplary flowchart of operations after the end of charging and at the start of charging.

Next, an explanation will be given of a procedure of charging the lithium ion battery 126 under the above charging control, by referring to the flowchart of FIG. 5.

When charging of the lithium ion battery 126 is completed (block 401), the impedance/voltage measurement unit 212 measures the voltage V1 and impedance Z1 of the battery 126 (block 402). The charging controller 200 monitors the discharged capacity of the battery 126, and determines whether the remaining capacity of the battery 126 is less than a threshold value (for example, 90% of the total capacity) previously stored in the charging controller 200 (block 403).

When the remaining capacity of the battery 126 is less than the threshold value (Yes, in block 403), the charging current value calculator 301 obtains the maximum allowable current Imax stored in the flash memory of the lithium ion battery 126 (block 404). On the other hand, when the remaining capacity of the battery 126 is not less than the threshold value (No, in block 403), block 403 is resumed.

The charging controller 200 calculates the first charging current I1 based on the maximum allowable current Imax (block 405). When the maximum allowable current Imax is specified as the preset charging current Iset for the charging circuit 211, the second charging current I2 is not calculated. The charging controller 200 sends the first charging current I1 to the charging circuit 211, and specifies the preset charging current Iset for the charging circuit 211 (block 406). After sending the first charging current I1, the charging controller 200 sends a command to start charging to the charging circuit 211 (block 407).

After receiving the charging start command, the charging circuit 211 determines whether a charge stop command is received from the overvoltage protector 202 within a preset time (block 408). The preset time is 1 second, for example.

When the charge stop command is received within the preset time (Yes in block 408), the charging circuit 211 instructs the charging current calculator 301 to calculate the overvoltage protection current Iovp. The charging current value calculator 301 obtains the overvoltage protection voltage Vovp from the overvoltage protector 202, and the impedance Z1 from the impedance measurement unit 212 (block 409). The charging current value calculator 301 calculates the overvoltage protection current Iovp from the voltage V1, impedance Z1 and overvoltage protection voltage Vovp (block 410). The charging current value calculator 301 informs the charging controller 200 of the calculated overvoltage protection current Iovp.

The charging controller 200 calculates the second charging current I2 based on the overvoltage protection current (block 411). When the overvoltage protection current Iovp is specified as the preset charging current Iset for the charging circuit 211, the first charging current I1 is not calculated. The charging controller 200 sends the second charging current I2 to the charging circuit 211, and specifies the preset charging current Iset for the charging circuit 211 (block 412). After sending the second charging current I2, the charging controller 200 sends a command to start charging to the charging circuit 211 (block 413).

By the operations described above, charging of a battery can be started even if impedance is high.

In the embodiment described herein, a personal computer is used as an example of an electronic device. The above-described charging technique may be applied to other devices, such as a cell-phone having a charging function. The charging technique may also be applied to a battery charger having a charging function only.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the embodiments. Indeed, the novel embodiments described herein may be embodied in variety of other forms; furthermore, various omissions, substitutions and changes in the form of the embodiments described herein may be made without departing from the spirit of the embodiments. The accompanying claims and their equivalents are intended to cover such forms or modifications as would fall within the scope and spirit of the embodiments.

What is claimed is:

1. A battery charging apparatus comprising:
   a charging module configured to charge a battery, the battery associated with a maximum allowable current value;
   a voltage measurement module configured to measure a first voltage value associated with the battery;
   an impedance measurement module configured to measure an impedance value associated with the battery;
   a protector configured to send a charge stop command to the charging module, in response to the first voltage value of the battery exceeding a threshold value;
   a current value calculator configured to calculate, based on the first voltage value, the impedance value, and the threshold value, an overvoltage protection current value; and
   a charging current value setting module configured to determine a first charging current value based on the maximum allowable current value, and to determine a second charging current value based on the overvoltage protection current value,
   wherein the charging current value setting module is configured to set the second charging current value to the charging module when the maximum allowable current value is higher than the overvoltage protection current value and to set the first charging current value when the maximum allowable current value is not higher than the overvoltage protection current value.

2. The apparatus of claim 1, wherein the charging current value setting module is further configured to set the first charging current value to the charging module and the charging current value setting module is further configured to set the second charging current value to the charging module.

3. The apparatus of claim 1, further comprising a charge start command sending module configured to send, to the charging module, a command to start the charging.

4. The apparatus of claim 3, wherein the start command is sent after the charging current value setting module determines the first charging current value or determines the second charging current value.

5. The apparatus of claim 1, wherein the charging current value setting module is configured to determine the first charging current value before the battery has been charged a predetermined number of times.

6. An electronic apparatus comprising;
   a charging module configured to charge a battery, the battery associated with a maximum allowable current value;
   a voltage measurement module configured to determine a first voltage value of the battery;
   an impedance value measurement module configured to determine an impedance value of the battery;
   a protector configured to send, to the charging module, a charge stop command;
   a current value calculator configured to calculate, based on the first voltage value, impedance value, and threshold value, an overvoltage protection current value associated with the battery;
   a charging current value setting module configured to determine a first charging current value based on the maximum allowable current value and to determine a second charging current value based on the overvoltage protection current value; and
   a charge start command sending module configured to send a command to start the charging after the charging current value setting module determines the first charging current value or the second charging current value,
   wherein the current value calculator calculates the overvoltage protection current value when the charge was stop command was sent.

7. The apparatus of claim 6, wherein the charging current value setting module is further configured to set the first charging current value to the charging module and the charging current value setting module is further configured to set the second charging current value to the charging module.

8. The apparatus of claim 1, the charging current value setting module is configured to compare the maximum allowable current value with the overvoltage protection current value.

9. A battery charging apparatus comprising:
   a charging module configured to charge a battery, the battery associated with a maximum allowable current value;
   a voltage measurement module configured to measure a first voltage value associated with the battery;
   an impedance measurement module configured to measure an impedance value associated with the battery;
   a protector configured to send a charge stop command to the charging module, in response to the first voltage value of the battery exceeding a threshold value;
   a current value calculator configured to calculate, based on the first voltage value, the impedance value, and the threshold value, an overvoltage protection current value; and
   a charging current value setting module configured to determine a first charging current value based on the maximum allowable current value, and to determine a second charging current value based on the overvoltage protection current value, wherein the charging current value setting module is configured to determine the first charging current value and to determine the second charging current value when, or after, the protector sends the charge stop command to the charging module.

10. The apparatus of claim 9, wherein the charging current value setting module is further configured to set the first charging current value to the charging module and the charging current value setting module is further configured to set the second charging current value to the charging module.

11. The apparatus of claim 9, further comprising a charge start command sending module configured to send, to the charging module, a command to start the charging.

12. The apparatus of claim 11, wherein the start command is sent after the charging current value setting module determines the first charging current value or determines the second charging current value.

13. The apparatus of claim 9, wherein the charging current value setting module is configured to determine the first charging current value before the battery has been charged a predetermined number of times.

* * * * *